Patented Aug. 22, 1933

1,923,427

UNITED STATES PATENT OFFICE 1,923,427

PROCESS OF PREPARING WHEY CONCENTRATE

Elmer E. Eldredge, Wilmette, Ill., assignor, by mesne assignments, to Kraft-Phenix Cheese Corporation, a Corporation of Delaware No Drawing. Application February 13, 1929
Serial No. 339,745

3 Claims. (Cl. 99—11)

The invention relates to improvements in whey concentrates and process of preparing the same.

In the manufacture of cheese the whey which is produced as a by-product contains usually about 6% of solids most of which is milk sugar. The material also contains smaller percentages of albumen and mineral salts. In its liquid form it may be used for feeding direct to stock, but as it is a dilute and bulky product and hence low in food value, the expense and trouble of retransporting it back to the farm from the cheese factory is relatively heavy. For this reason, the farmers in some instances may be induced to take and use it, but they will pay little, if anything, for the privilege, so that it is generally classed as a waste product of no value.

Attempts have been made to evaporate the whey and use the solids or concentrates so obtained in various ways, for example, in the manufacture of food products for human consumption and also for stock or chicken feeds. It has been found, however, that when using such evaporating process and equipment as are available for the purpose, it is necessary to remove substantially all of the water content including the water of crystallization of the sugar content. The ordinary evaporating process is designed to turn out the concentrate in a substantially bone-dry condition and in which the water content is not more than about 2%. This material has been found to be quite hygroscopic in character principally because the necessarily high evaporating temperature has driven off the water of crystallization of the sugar which consequently is thirsty for the water which it requires to return to its normal crystalline condition.

Ordinary whey concentrates or whey solids when freshly produced, if left exposed to the atmosphere for any length of time will rapidly absorb moisture, and the material, although originally in the form of a powder, is soon converted into a cake. Furthermore, and which is more important, during the transition stage between the anhydrous condition and the crystalline condition, the material becomes very gummy or sticky so that it interferes seriously with the proper functioning of the equipment by which it is to be mixed with other materials entering into the final product, for example, cheese, bakery goods, or stock feeds. For this reason whey concentrates have had very limited use or distribution up to the present time.

I have discovered that the gumming tendency of this material may be effectively and permanently eliminated and in doing so I take advantage of just those properties or characteristics from which the gumming tendency results.

In general, my improved process provides for the production of the whey solids in the usual way so as to obtain a material containing not more than about 2% of moisture. No special form of apparatus is required. Good results are obtained through the use of equipment in which the whey is sprayed into a heated gaseous medium and is delivered in the form of a finely divided powder. This powdered material is then, preferably by direct admixture of water, caused to absorb or take up an additional 8% of moisture rapidly. The mass is then allowed to cake and after a sufficient length of time, the cake is ground up in any suitable grinding equipment.

As a specific example for the use of my improved process, I take 150 pounds of fresh whey solids containing 2% of water. This material is introduced into a mixing device, for example, a Day mixer, together with about 12 pounds of water, the mixing being effected very rapidly so as to prevent development of gumminess in time to interfere with the operation of the mixer or removal of the material therefrom.

As soon as the mixing has been completed, this operation requiring only a minute or so, the mixed material is dumped out of the mixer into a series of shallow pans, preferably not more than about six inches deep, so that the heat developed by the absorption of water may be dissipated with sufficient rapidity to prevent overheating with consequent damage to the product.

The material is preferably allowed to stand in the pans about two or three hours or sufficiently long to form a cake after which the pans may be emptied. The materal is then allowed to stand in a pile and after it has cooled sufficiently, say in twenty-four hours, it is ground up in any convenient apparatus, for example, a centrifugal mill, so as to pass through a screen of about twenty mesh.

My improved product thus obtained, having taken up water to its entire capacity, will not thereafter develop any gummy or sticky tendency, nor will it cake or otherwise develop any of the undesirable properties which have been encountered in connection with the previous use of this type of material.

The above described details are illustrative of merely one application of the invention, the scope of which should be determined by reference to the appended claims, said claims being construed as broadly as possible, consistent with the state of the art.

I claim as my invention

1. The improved process of preparing whey concentrate which consists in evaporating whey and converting same to a comminuted solid in which the sugar is in an anhydrous condition, then adding sufficient water to recrystallize the sugar and thereby convert the material into cake form, and then comminuting the cake.

2. The improved process of preparing whey concentrates which consists in evaporating whey and converting same to a comminuted solid containing about 2% of water and in which substantially all of the sugar content is in an anhydrous condition, then mixing with the material about 8% of water so as to recrystallize the sugar, permitting the material to cake and subsequently comminuting the cake.

3. The improved process of preparing whey concentrate which consists in evaporating the whey and converting the same into a comminuted solid containing the sugar in a substantially anhydrous condition, then rapidly mixing with the material sufficient water to recrystallize the sugar, then permitting the material to stand a sufficient length of time to recrystallize the sugar and thereby form a cake, while at the same time preventing overheating of the material and then converting the cake into the form of a powder.

ELMER E. ELDREDGE.